Figure 1:
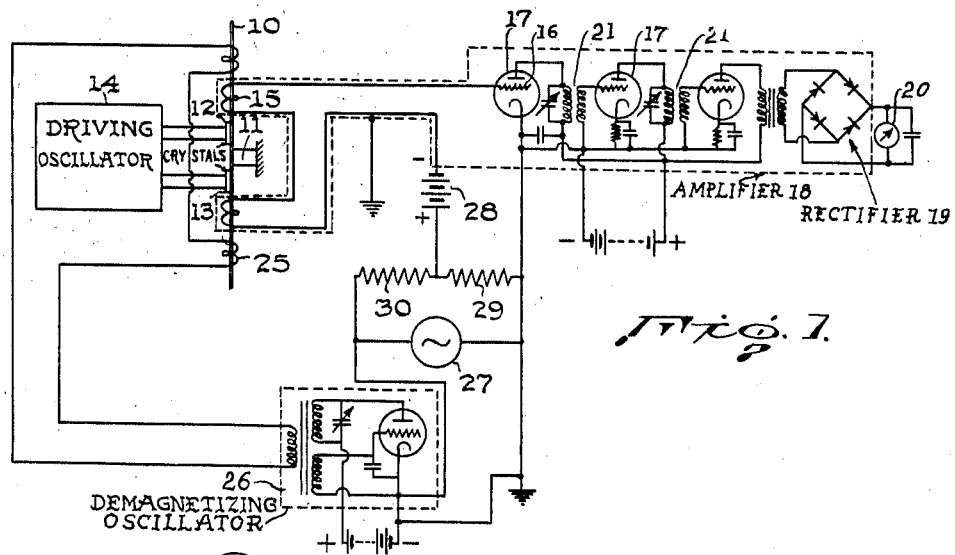

Inventor
Ralph D. Wyckoff

Nov. 16, 1943.   R. D. WYCKOFF   2,334,593
APPARATUS FOR MEASURING MAGNETIC FIELDS
Filed May 8, 1941   3 Sheets-Sheet 2

Inventor
Ralph D. Wyckoff
By A. M. Houghton
his Attorney

Patented Nov. 16, 1943

2,334,593

UNITED STATES PATENT OFFICE 2,334,593

APPARATUS FOR MEASURING MAGNETIC FIELDS

Ralph D. Wyckoff, Pittsburgh, Pa., assignor to Gulf Research & Development Company, Pittsburgh Pa., a corporation of Delaware Application May 8, 1941, Serial No. 392,541

8 Claims. (Cl. 175—183)

This invention relates to apparatus for measuring magnetic fields; and it comprises an apparatus for measuring the intensity or direction of magnetic fields including in combination an element of magnetizable material the permeability of which is a function of stress and supported to be free to vibrate, means for vibrating the element whereby periodically to vary the flux induced in said magnetizable material by the ambient field by virtue of periodic stresses produced in such vibration, means operated on by said varying flux for producing an alternating current corresponding to said varying flux, and exhibiting means for said current; said apparatus usually including in addition, means for periodically supplying a standardizing electric field to the element, and means operable during the times the standardizing field is being applied to the element for preventing transmission of current from the alternating current producing means to the exhibiting means; all as more fully hereinafter set forth and as claimed.

In many arts it is desirable to measure the intensity or direction of magnetic fields; for example, in geophysical prospecting, in navigation (induction compasses) and in finding flaws in railway track or other steel articles.

In measuring the intensity and direction of magnetic fields, such as the earth's magnetic field, one expedient is to make use of the fact that when a bar of magnetic material is placed in a magnetic field some magnetic flux is induced in it. This flux can be taken as a measure of the strength of the ambient field. There are, however, difficulties in the way of securing accurate results by this means. The induced flux is usually weak, especially in the case of the terrestrial field, and moreover is constant and therefore difficult to detect. Another difficulty is due to hysteresis; a tendency of a bar, once magnetized, to retain some of the magnetism even after the field is removed. This makes readings uncertain.

The main object of the invention is to provide a system for measuring the intensity and direction of magnetic fields, making use of flux induced in a bar of magnetic material, in which system the stated disadvantages are eliminated and new advantages are secured.

According to the invention there is provided a magnetic bar or strip exposed to the field to be measured, advantageously made of material of high permeability and high magnetostrictive effect. The bar is arranged to be vibrated at relatively high frequency at constant amplitude. This vibration causes a cyclic change in the permeability of the bar, since the permeability of ferromagnetic materials is a function of their instantaneous state of stress. The magnitude of the cyclic change is especially pronounced in the case of materials of the class mentioned. Assuming the vibratory bar to be placed in a magnetic field, a magnetic flux is induced in the bar, of periodically varying amplitude. A coil is located adjacent the bar and there appears at the output thereof an alternating voltage of amplitude corresponding to changes of the induced flux. This voltage is amplified and indicated or recorded. It is relatively simple to amplify alternating currents, as distinguished from direct (non-fluctuating) currents.

As stated, magnetic materials have more or less tendency to retain some magnetism after removal from a magnetic field. I overcome this disadvantage by periodically demagnetizing the bar; or, alternatively, magnetizing it to saturation. This standardizing procedure insures that the bar follows even rapid field changes very closely. Means are provided to prevent voltages created in the pickup coil during such magnetization or demagnetization, from being communicated to the indicating or recording means.

Figure 2:
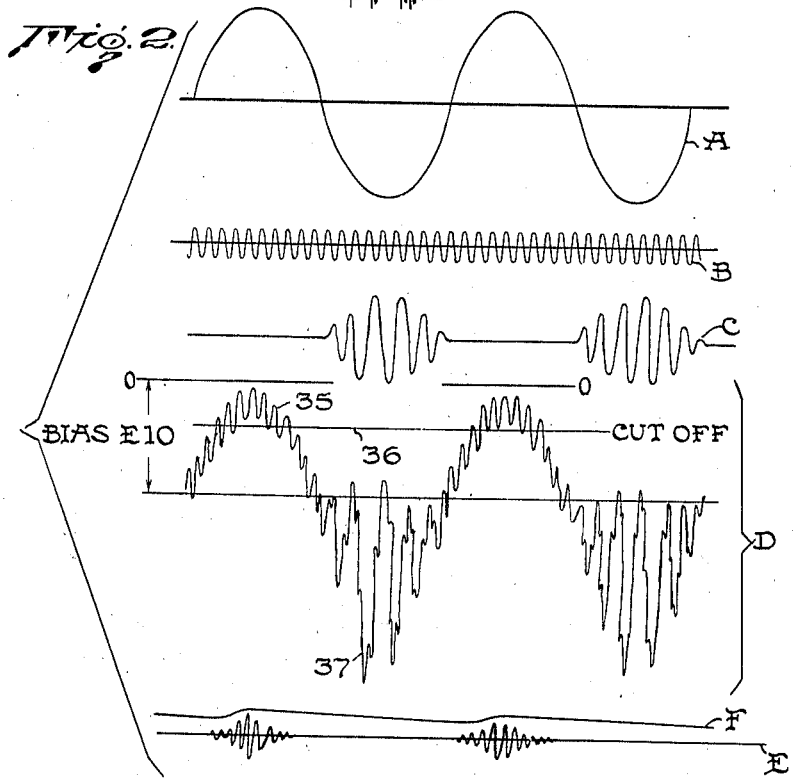
Figure 3:
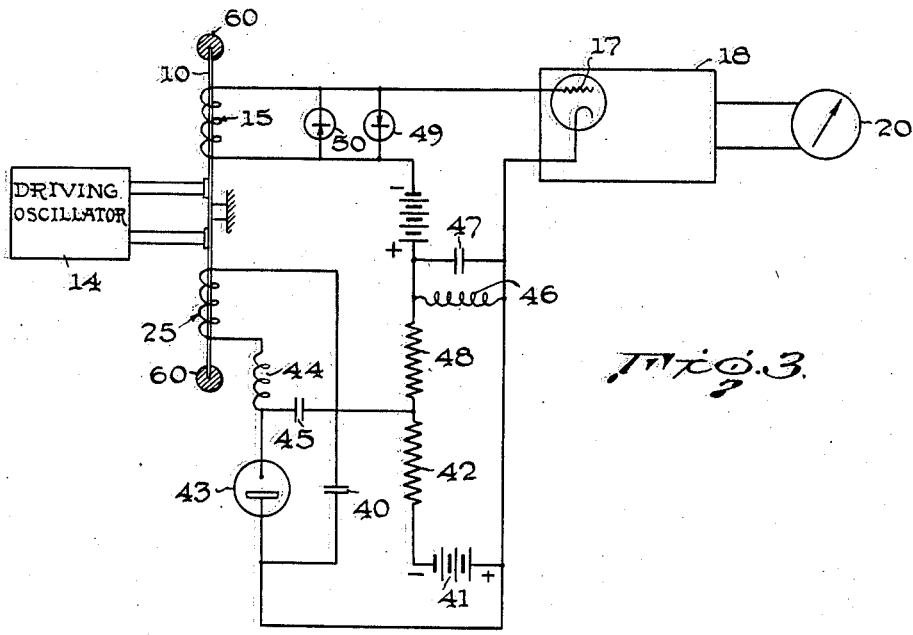
Figure 4:
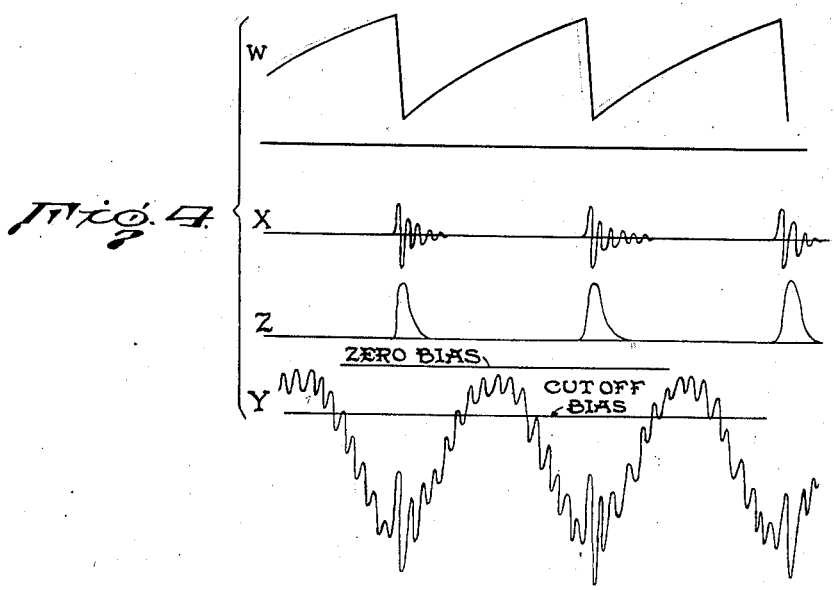

In the accompanying drawings are illustrated diagrammatically three examples of specific embodiments of apparatus within the purview of the invention. In the drawings, Fig. 1 is a circuit diagram of one form of the invention, Fig. 2 is a diagram illustrative of the principles of operation of the apparatus of Fig. 1, Fig. 3 is a circuit diagram of a modification of the invention of Fig. 1, making use of a gas-tube relaxation oscillator as a standardizer, Fig. 4 is a diagram illustrative of the principles of operation of the apparatus of Fig. 3.

Figure 5:
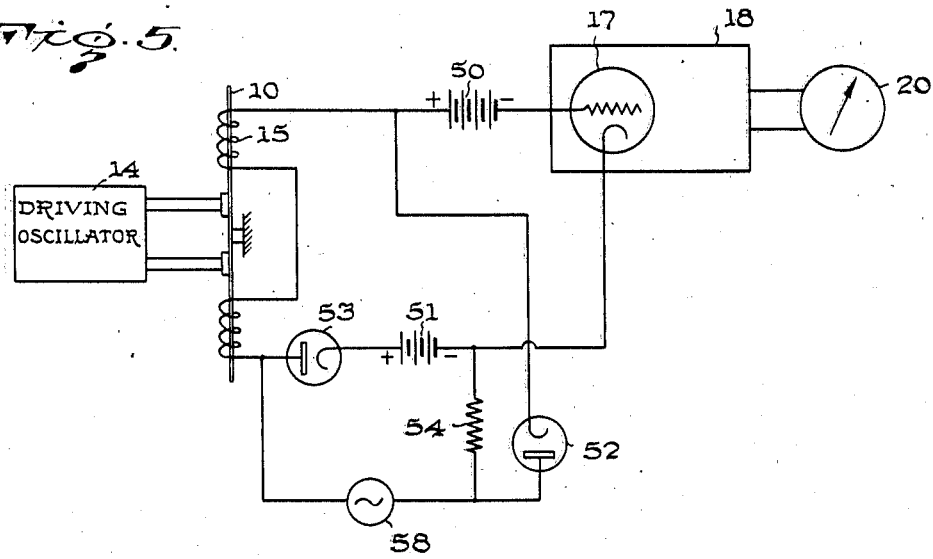
Figure 6:
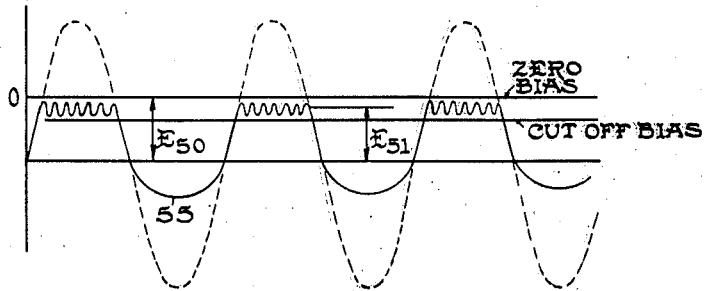

Fig. 5 is a circuit diagram of a modification of the invention of Fig. 1, using a single coil for signal and for standardization, and Fig. 6 is a diagram illustrative of the principles of operation of the apparatus of Fig. 5.

Referring to the drawings and more especially to Fig. 1, the invention is shown as comprising a strip or bar 10 of magnetic material, supported at the middle at 11 leaving the rest of the strip free to vibrate. The material of the strip is advantageously a high-permeability, highly magnetostrictive alloy such as Mu-Metal or Hypernick. The dimensions 8 inches long, 0.25 inch wide and 0.014 inch thick are convenient. The strip or rod is caused to vibrate through the agency of small piezoelectric crystals 12 and 13, advantageously of Rochelle salt, cemented thereto near the middle and employed in conjunction with an amplifier-oscillator 14 to drive the rod at its natural frequency of longitudinal vibration. The amplifier output is delivered to the driving crystal 13 and the resulting vibrations picked up by the feedback crystal 12 return to the oscillator in proper phase relationship to maintain the oscillations. These crystals are arranged to change their length, upon application of varying potential thereto, in a direction parallel to the length of the bar 10, whereby to produce such longitudinal vibration. If the bar tends to vibrate in one or more of the possible modes of vibration other than longitudinal vibration at resonant frequency, a simple filter can be inserted in the driving amplifier 14 (described above) to pass only the frequency of longitudinal vibration.

Changes of flux in the bar are detected by a pickup coil 15 wound around the bar and electrostatically shielded by means known per se (not shown). The output of the coil is applied to the grid 16 of an amplifier tube 17 in amplifier 18, the output of which is delivered through a frequency-selective device shown as a tuned transformer 21 and a rectifier 19 to an exhibiting device 20, conveniently a sensitive direct current meter. The tuned transformer 21 is adjusted to eliminate the frequency of generator 27 and harmonics thereof generated in tube 17. Extra stages of amplification can be provided in the amplifier as desired.

A demagnetizing coil 25 is provided, advantageously surrounding the entire length of the bar, and connected to a demagnetizing oscillator 26. This oscillator is arranged for intermittent operation on the negative half-cycles of the wave from a relatively low frequency alternating current source 27. This source is also made use of to switch the output from pickup coil 15 off and on by varying the bias on tube 17. A battery 28 is arranged to provide a high negative bias on the tube which is overcome sufficiently to let signals pass only on the positive peaks of the voltage wave from source 27. Resistors 29 and 30 are provided to reduce the alternating current voltage to a suitable value for application to the grid circuit.

The coils described are advantageously spaced from the rod out of direct contact therewith, though they may touch the rod at its center, where it is supported, as this is a nodal point. However the windings if sufficiently small can be wound directly on the rod, being carefully cemented or otherwise fastened to it. The pickup coil 15 can be concentrated at the middle part of the rod, but the demagnetizing coil 25 is best extended over most of the length of the rod so that all parts thereof can be demagnetized.

In operation, assuming the apparatus to be placed where it is subject to a magnetic field, flux is induced in the bar, of periodic character due to the fluctuating permeability of the magnetostrictive bar as a result of its vibration. (Permeability is the ratio of magnetic-flux density to magnetizing force. It is the ratio of the magnetic flux in a material, to the flux which would exist if the material were replaced by air, the applied field remaining unchanged. Magnetostrictive effect is the change in shape of a bar associated with a change of magnetism therein. With highly magnetostrictive materials a given degree of distortion of shape corresponds to a large change in magnetism and vice versa.)

The periodically varying flux causes a correspondingly alternating voltage to appear at coil 15, which voltage is amplified at 17, rectified and indicated at 20. The bar is periodically demagnetized by applications of current from oscillator 26, and while the demagnetizing current is "on," tube 17 is prevented from transmitting signals by virtue of the bias thereon from battery 28; which bias is only relieved when the demagnetizing current is "off."

Fig. 2 illustrates the nature of the voltages in various parts of Fig. 1. The A. C. supply voltage is shown at A. Its frequency is conveniently 1 to 10 cycles to insure demagnetization of the bar 1 to 10 times a second, but higher frequencies can be used when it is required to have the apparatus respond accurately to rapidly varying magnetic fields. Oscillator 14 generates a continuous train of waves as shown at B. This frequency depends on the length and material of core 10 and is often about 3,000 to 20,000 cycles. Each downward peak of wave A puts positive voltage on the plate of oscillator 26 which generates wave trains as shown at C. The frequency of this oscillator is advantageously different from the signal frequency. It should be several times the A. C. supply frequency so that each wave train will provide effective demagnetization by reversing the field many times while gradually decreasing the height of successive peaks; as indicated at C.

The voltage applied to the grid of tube 17 is as in D (Fig. 2). Conditions are such that the signal ripple 35 exceeds the cut-off bias 36 of the tube, but the pulse 37 induced by the demagnetizing oscillator is eliminated by the tube bias. After filtering the signal, it appears as at E. This voltage after rectification may be smoothed out to nearly pure D. C. as indicated at F.

In Fig. 3 there is shown a modification of the invention wherein a gas-tube relaxation oscillator is employed to provide standardizing pulses for demagnetization of the cores. Such oscillator includes a condenser 40 arranged to be repeatedly charged from a battery 41 through a resistor 42 and to discharge through a gas tube 43 and the demagnetizing coil 25. The character of the voltage wave generated across condenser 40 is indicated at W in Fig. 4. The wave is converted to a series of damped wave trains X by provision of an inductance 44 and capacitance 45 of suitable values, as shown. As the wave decays, the current reverses directions several times, causing the bar 10 to be thoroughly demagnetized.

If desired, instead of periodically demagnetizing the bar, it can be periodically magnetized to saturation. This is readily accomplished by adjusting circuit constants to make the discharge non-oscillatory, whereby the pulses become single and unidirectional as in Z in Fig. 4. In this case the apparatus does not give zero output for zero applied field; instead it gives a null indication at some finite value of the applied field.

Since no A. C. source is used in Fig. 3, the A. C. commutating voltage which cuts tube 17 off during receipt of the standardizing pulse is obtained from condenser 40. A filter consisting of inductance 46, condenser 47, and resistor 48 is used to smooth out the saw-tooth wave into a sine wave. The coil-condenser combination should be tuned fairly sharply to the frequency of the saw-tooth wave. The phase of the resultant sine wave can be adjusted, if necessary, by changing either the inductance 46 or capacitance 47 a small amount. This assures that the negative peak of the commutating voltage is centered on the standardizing pulse. Fig. 4 shows at Y the appearance of the total voltage at the grid of tube 17 when the phase adjustment has been properly made.

If the standardizing pulse causes excessive voltage at tube 17, rectifiers 49 and 50 can be shunted across coil 15 as shown. The rectifiers will have little shorting effect on the desired signals but will limit the stronger voltages because their resistance decreases rapidly as the voltage increases.

Figs. 5 and 6 illustrate a modification wherein a single coil is used for signal and standardization. Tube 17 is biased well beyond cut-off by a battery 50 of suitable voltage. An A. C. source 58 saturates the core 10 in one direction of polarization and makes the amplifier sensitive in the other direction. When the left end of source 58 is positive, the bias on tube 17 is counteracted. When the voltage reaches and exceeds the voltage of battery 51, current begins to flow through rectifier 53, so that voltage in excess of that of battery 51 is absorbed in resistor 54. The resultant wave is square-topped, as shown in Fig. 6. Only a small ripple voltage due to the vibratory excitation and ambient magnetic field occurs on the flat part of these square-topped waves. The voltage of battery 51 is adjusted so that the signal fluctuations fall in the range between zero bias and cut-off bias, so that the amplifier is most sensitive to them. On the reverse half of the A. C. cycle rectifier 52 becomes conductive allowing a relatively heavy current to flow through coil 15 to saturate the core. The voltage drop in rectifier 52 tends to make the bias on tube 17 still more negative as indicated at 55 in Fig. 6. The full voltage of source 58 never reaches the grid of tube 17. The output variations of the tuned amplifier are due to the variations in the ripple voltage on the flat wave crests. These vary with applied field as in the other embodiments.

The invention is susceptible of embodiment in numerous forms, to meet particular requirements. In all cases the significant features are the mechanical vibration which changes the stresses in the sensitive core, so that voltages are induced in a pick-up coil, the standardizing circuit which either magnetizes the core to saturation or demagnetizes it, and the means to prevent standardization voltages created in the pick-up coil from being carried to the indicating device.

The magnetostrictive alloys used have wave velocities of around 16,000 feet per second. Since the cores are preferably half-wave vibrators, a six-inch core has a natural frequency of about 16,000 cycles. It is convenient in most cases to employ a core about eight inches long having a half-wave longitudinal frequency of 12,000 cycles. Sensitivity can be increased by loading the ends of the core with small weights as indicated at 60 in Fig. 3. This is accompanied by a decrease in frequency of oscillation but the stress is distributed more uniformly throughout the bar. Weights sufficient to drop the natural resonant frequency of the bar by a factor of three or four have been found desirable.

The useful signal voltage which indicates the field intensity has the same frequency as the mechanical vibrations. It dies to zero when the flux in the core is zero. There is also another voltage component generated by the bar at the second harmonic of the applied frequency. This component does not disappear at zero core magnetization. It does not destroy the sensitivity of the null balance at zero field because the filter used in the circuit cuts it out. This component may also be removed by biasing the core with a steady mechanical stress applied to the bar as its presence is apparently due to spontaneous magnetization of the bar in one direction by stresses of either sign (tension or compression).

The invention can be employed for measuring magnetic fields as described and also for controlling a relay, etc., in accordance with predetermined changes in ambient field.

What I claim is:

1. An apparatus for measuring magnetic fields comprising an element of magnetizable material whose permeability is a function of stress and supported to be free to vibrate, piezoelectric crystal means on said element adapted upon energization to vibrate said element to cause periodic stresses therein, means for applying an alternating current to said crystal means whereby to vibrate the element, with consequent periodic variation of the flux induced in said element by the ambient field, means operated on by said varying flux for producing an alternating current corresponding thereto and exhibiting means for said current.

2. An apparatus for measuring magnetic fields comprising an element of magnetizable material whose permeability is a function of stress and supported to be free to vibrate, means for vibrating the element whereby periodically to vary the flux induced in said magnetizable material by the ambient field by virtue of periodic stresses produced in such vibration, means operated on by said varying flux for producing an alternating current corresponding to said varying flux, exhibiting means for said current, and means for periodically applying a standardizing field to said element.

3. An apparatus for measuring magnetic fields comprising an element of magnetizable material whose permeability is a function of stress and supported to be free to vibrate, means for vibrating the element whereby periodically to vary the flux induced in said magnetizable material by the ambient field by virtue of periodic stresses produced in such vibration, means operated on by said varying flux for producing an alternating current corresponding to said varying flux, exhibiting means for said current, means for periodically applying a standardizing field to said element and means operable during the times the standardizing field is being applied to the element, for preventing transmission of current from said alternating-current-producing means to said exhibiting means.

4. An apparatus for measuring magnetic fields comprising an element of magnetizable material whose permeability is a function of stress and supported to be free to vibrate, means for vibrating the element at a relatively high frequency whereby periodically to vary the flux induced in said magnetizable material by the ambient field by virtue of periodic stresses produced in such vibration, means operated on by said varying flux for producing an alternating current corresponding to said varying flux, exhibiting means for said current, means for periodically applying a standardizing field to said element, at a periodicity lower than the frequency of vibration of said element, and means operable during the times the standardizing field is being applied to the element, for preventing transmission of current from said alternating-current-producing means to said exhibiting means.

5. An apparatus for measuring magnetic fields comprising an element of magnetizable material whose permeability is a function of stress and supported to be free to vibrate, means for vibrating the element whereby periodically to vary the flux induced in said magnetizable material by the ambient field by virtue of periodic stresses produced in such vibration, means operated on by said varying flux for producing an alternating current corresponding to said varying flux, exhibiting means for said current, means for periodically applying to the element pulses of a rapidly alternating current field whereby to demagnetize said element and means operable during the times the demagnetizing field is being applied to the element, for preventing transmission of current from said alternating-current-producing means to said exhibiting means.

6. An apparatus for measuring magnetic fields comprising an element of magnetizable material supported to be free to vibrate, means for vibrating the element whereby periodically to vary the flux therein, means operated on by said varying flux for producing an alternating current corresponding to said varying flux, exhibiting means for said current, means for periodically applying a standardizing field to said element, and means operable during the times the standardizing field is being applied to the element, for preventing transmission of current from said flux-operable means to the exhibiting means.

7. An apparatus for measuring magnetic fields comprising an element of magnetizable material supported to be free to vibrate, means for vibrating the element to periodically vary the flux therein, means operated on by said varying flux for producing an alternating signal current corresponding to said varying flux, exhibiting means for said current, a source of oscillating current of frequency different from that of the vibrating element, and means adapted successively (1) to cause application of said oscillating current as a field adjacent said element of such character as to standardize the magnetization thereof, while simultaneously preventing transmission of the signal current to the exhibiting means and (2) to cause disapplication of said oscillating current field and simultaneously to cause transmission of the signal current to the exhibiting means.

8. An apparatus for measuring magnetic fields comprising an element of magnetizable material supported to be free to vibrate, means for vibrating the element to periodically vary the flux therein, means operated on by said varying flux for producing an alternating signal current corresponding thereto, exhibiting means for said current, a source of oscillating current of frequency different from that of the vibrating element, means for supplying current from said source as a field to the vibrating element, a source of alternating current of frequency lower than that of the oscillating current, said source of oscillating current being controlled by the source of alternating current in such manner as to be rendered operative to apply such field, only during every other half-cycle of the alternating current wave, and circuit means connecting said flux-operated means and exhibiting means, controlled by the source of alternating current in such manner as to be rendered operative to transmit signal current to the exhibiting means only during the half-cycles of the alternating current wave intermediate said first-named half-cycles.

RALPH D. WYCKOFF.